United States Patent
Di Girolamo et al.

(10) Patent No.: US 10,244,432 B2
(45) Date of Patent: Mar. 26, 2019

(54) METHOD AND APPARATUS FOR ENABLING CELL RESELECTION FOR WTRU OPERATING IN DISCONTINUOUS RECEPTION

(71) Applicant: InterDigital Patent Holdings, Inc., Wilmington, DE (US)

(72) Inventors: Rocco Di Girolamo, Laval (CA); Diana Pani, Montreal (CA); Christopher R. Cave, Dollard-des-Ormeaux (CA); Paul Marinier, Brossard (CA); Vincent Roy, Longueuil (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 70 days.

(21) Appl. No.: 15/643,338

(22) Filed: Jul. 6, 2017

(65) Prior Publication Data

US 2017/0311207 A1    Oct. 26, 2017

Related U.S. Application Data

(63) Continuation of application No. 13/962,232, filed on Aug. 8, 2013, now Pat. No. 9,736,734, which is a (Continued)

(51) Int. Cl.
*H04W 36/00* (2009.01)
*H04W 76/28* (2018.01)
(Continued)

(52) U.S. Cl.
CPC ........ *H04W 36/0011* (2013.01); *H04W 76/28* (2018.02); *H04W 60/00* (2013.01); *H04W 76/27* (2018.02); *Y02D 70/20* (2018.01)

(58) Field of Classification Search
CPC ........... H04W 36/0011; H04W 76/048; H04W 60/00; H04W 76/046
See application file for complete search history.

(56) References Cited

U.S. PATENT DOCUMENTS 9,736,734 B2 * 8/2017 Di Girolamo ........ H04W 76/28
2002/0007459 A1 1/2002 Cassista et al.
(Continued)

FOREIGN PATENT DOCUMENTS

AU    2009/209066 B2    8/2009
CN        1533069 A     9/2004
(Continued)

OTHER PUBLICATIONS

3rd Generation Partnership Project (3GPP), R2-080362, "Cell_FACH DRX", Nokia Corporation, Nokia Siemens Networks, 3GPP TSG-RAN-WG2 Meeting #60, Sevilla, Spain, Jan. 14-18, 2008, 3 pages.

(Continued)

*Primary Examiner* — Raj Jain
*Assistant Examiner* — Chuong M Nguyen
(74) *Attorney, Agent, or Firm* — Condo Roccia Koptiw LLP

(57) ABSTRACT

A method for discontinuous reception (DRX) implemented in a wireless transmit/receive unit (WTRU) during cell reselection including initiating cell reselection; disabling DRX operation, wherein disabling DRX operation enables continuous reception; transmitting a CELL UPDATE message; receiving a CELL UPDATE CONFIRM message; and enabling DRX operation based on the received CELL UPDATE CONFIRM message.

11 Claims, 6 Drawing Sheets

Related U.S. Application Data continuation of application No. 12/363,197, filed on Jan. 30, 2009, now Pat. No. 8,532,599.

(60) Provisional application No. 61/025,657, filed on Feb. 1, 2008.

(51) Int. Cl.
*H04W 76/27* (2018.01)
*H04W 60/00* (2009.01)

(56) References Cited

U.S. PATENT DOCUMENTS

| | | | |
|---|---|---|---|
| 2007/0015530 A1 | 1/2007 | Ding | |
| 2007/0133479 A1* | 6/2007 | Montojo | H04W 52/0216 370/335 |
| 2008/0130488 A1 | 6/2008 | Kuo | |
| 2008/0182594 A1* | 7/2008 | Flore | H04W 76/27 455/458 |
| 2008/0192703 A1 | 8/2008 | Suzuki | |
| 2008/0232313 A1* | 9/2008 | Kuo | H04W 36/0055 370/329 |
| 2008/0311932 A1* | 12/2008 | Kuo | H04W 76/28 455/458 |
| 2009/0086671 A1* | 4/2009 | Pelletier | H04W 72/12 370/329 |
| 2009/0196256 A1 | 8/2009 | Di Girolamo et al. | |
| 2009/0225709 A1* | 9/2009 | Wager | H04W 72/0413 370/329 |
| 2009/0318170 A1 | 12/2009 | Lee et al. | |
| 2012/0100896 A1 | 4/2012 | Aoyama et al. | |

FOREIGN PATENT DOCUMENTS

| | | |
|---|---|---|
| CN | 1533070 A | 9/2004 |
| CN | 1735260 A | 2/2006 |
| CN | 1735263 A | 2/2006 |
| EP | 2034633 A1 | 3/2009 |
| JP | 2007-166233 A | 6/2007 |
| JP | 5208221 B2 | 6/2013 |
| TW | 2008-24369 A | 6/2008 |
| TW | 2008-38337 A | 9/2008 |
| TW | 2008-38341 A | 9/2008 |
| WO | WO 2000/13377 A1 | 3/2000 |
| WO | WO 2007/022266 A1 | 2/2007 |
| WO | WO 2007/025138 A2 | 3/2007 |
| WO | WO 2007/111941 A2 | 10/2007 |
| WO | WO 2007/112219 A2 | 10/2007 |
| WO | WO 2007/145035 A1 | 12/2007 |
| WO | WO 2008/001726 A1 | 3/2008 |
| WO | WO 2009/097506 A1 | 8/2009 |

OTHER PUBLICATIONS

3rd Generation Partnership Project (3GPP), R2-081563, "Details of Cell FACH DRX Scheme", Nokia Corporation, Nokia Siemens Networks, 3GPP TSG RAN WG2 Meeting #61bis, Shenzhen, China, Mar. 31-Apr. 4, 2008, 3 pages.

3rd Generation Partnership Project (3GPP), R2-084644, "Introduction of CELL_FACH DRX", Nokia Corporation, Nokia Siemens Networks, 3GPP TSG-RAN-WG2 Meeting #63 Jeju Island, South Korea, Aug. 18-22, 2008, 17 pages.

3rd Generation Partnership Project (3GPP), RP-070679, "Enhanced UE DRX for FDD", TSG-RAN #37 Meeting Riga, Latvia, Sep. 11-14, 2007, 3 pages.

3rd Generation Partnership Project (3GPP), Tdoc R2-060967, "DRX and DTX in LTE Active", Ericsson, 3GPP TSG RAN WG2 Meeting#52 Athens, Greece Mar. 27-31, 2006, 1-5.

3rd Generation Partnership Project (3GPP), Tdoc R2-074036, "Enhanced UE DRX", Ericsson, 3GPP TSG RAN WG2 #59bis, Shanghai, China, Oct. 8-12, 2007, 3 pages.

3rd Generation Partnership Project (3GPP), TS 25.331 V8.0.0, "Technical Specification Group Radio Access Network, Radio Resource Control (RRC), Protocol Specification (Release 8)", Sep. 2007, 1-1460.

3rd Generation Partnership Project (3GPP), TS 25.331 V8.1.0, "Technical Specification Group Radio Access Network, Radio Resource Control (RRC), Protocol Specification (Release 8)", Dec. 2007, 1-1471.

3rd Generation Partnership Project (3GPP), TS 25.331 V8.5.0, "Technical Specification Group Radio Access Network, Radio Resource Control (RRC), Protocol Specification (Release 8)", Dec. 2008, 1-1646.

3rd Generation Partnership Project (3GPP), Tdoc R2-080213, "Enhanced UE DRX", Ericsson, 3GPP TSG-RAN WG2 #60bis, Sevilla, Spain, Jan. 14-18, 2008, 1-2.

* cited by examiner

METHOD AND APPARATUS FOR ENABLING CELL RESELECTION FOR WTRU OPERATING IN DISCONTINUOUS RECEPTION

CROSS REFERENCE TO RELATED APPLICATION

This application is a continuation of U.S. patent application Ser. No. 13/962,232, filed Aug. 8, 2013, which is a continuation of U.S. patent application Ser. No. 12/363,197, filed Jan. 30, 2009, now issued as U.S. Pat. No. 8,532,599, on Sep. 10, 2013, which claims the benefit of U.S. Provisional Patent Appl. 61/025,657, filed Feb. 1, 2008, which is incorporated by reference as if fully set forth.

FIELD OF INVENTION

This application is related to wireless communications.

BACKGROUND

Discontinuous Reception (DRX) and Discontinuous Transmission (DTX) were introduced in the CELL_DCH state as part of the Continuous Packet Connectivity (CPC) feature of the Third Generation Partnership Project (3GPP) Release 7. DRX and DTX operation, applied to wireless transmit/receive units (WTRUs) in the CELL_DCH state, allow the radio access network to maintain temporarily inactive WTRUs in the CELL_DCH state by reducing the interference cause by these WTRUs (i.e. reduce wasted system capacity) and reducing the WTRU battery consumption.

In Release 7, a two-tiered DRX scheme was introduced for WTRUs in the CEL L_PCH state. Upon transition to the CELL_PCH state the WTRU enters DRX mode using a shorter DRX cycle and after a period of inactivity the WTRU switches to a longer DRX cycle.

A new feature has been introduced as part of 3GPP Wideband Code Division Multiple Access (WCDMA) Release 8 to enable DRX operation for a WTRU in the CELL_FACH state. A fixed DRX pattern was introduced which is in constant use during the entire time period that a WTRU is in the CELL_FACH state with the exception of when the WTRU has enhanced Dedicated Channel (E-DCH) resources allocated. When the WTRU is allocated E-DCH resources it may operate in continuous reception and transmission mode, allowing it to continuously transmit and receive continuously on the downlink. After the E-DCH resources are released, the WTRU and a Node-B then start to follow the fixed DRX pattern derived from a Radio Network Temporary Identifier (RNTI) of the WTRU.

The DRX pattern used by a specific WTRU may be determined by a user-specific identifier such as an E-DCH-RNTI (E-RNTI), High-Speed Downlink Shared Channel (HS-DSCH) RNTI (H-RNTI), or Controlling Radio Network Controller (C-RNTI). The behavior of the WTRU and the DRX pattern is not specified for a WTRU that does not have an allocated RNTI (e.g. when the WTRU sends a CELL_UPDATE for cell reselection and has not yet received its CELL_UPDATE CONFIRM message). Additionally, WTRU behavior is not defined for when a radio link failure occurs in the CELL_DCH state. A WTRU experiencing the radio link failure moves to the CELL_FACH state and deletes all the dedicated downlink and uplink information allocated to the WTRU while in CELL_DCH. These resources include the E-RNTI, H-RNTI, and C-RNTI. The WTRU then sends a CELL UPDATE message with cause "radio link failure" and waits for the CELL UPDATE CONFIRM. During this time, the WTRU does not have a dedicated RNTI. Further, no DRX behavior is defined for a WTRU in idle mode and initiating a Radio Resource Control (RRC) connection request. When a WTRU is in idle mode, the WTRU may not have a dedicated RNTI when a RRC Connection Request message is sent. As a result, the WTRU has to wait to receive a RRC Connection SETUP message from the network over HS-DSCH, which may assign a dedicated RNTI to the WTRU.

Similarly, methods for managing the transitions of a WTRU between DRX operation and Continuous Reception (CRX) operation are desired. In one proposal a WTRU may be configured to link the transition between DRX operation and CRX operation to the start of an enhanced random access channel (E-RACH) access or an E-DCH in the CELL_FACH state and Idle mode procedure. Further, the transition of a WTRU between CRX operation to DRX operation may be linked to the release of its allocated E-DCH resources. However, this behavior may create problems because a WTRU may be operating in DRX in certain conditions where it would need to be listening for signaling or data from a UMTS Terrestrial Radio Access Network (UTRAN). For example, such a scenario may occur when a WTRU sends a CELL_UPDATE message for cell reselection using the E-DCH in the CELL_FACH state to move to a new Node-B and then resumes DRX operation after releasing its E-DCH resources. If the new Node-B is unaware of the DRX pattern used by the WTRU, it may transmit its response (e.g. the CELL_UPDATE CONFIRM) while the WTRU is in DRX, thus preventing the WTRU from receiving the response. Another scenario where a problem may occur is when a WTRU sends a CELL_UPDATE message for cell reselection using the Random Access Channel (RACH) to moves to a new Node-B. Since the start of a RACH access procedure is not currently a trigger to transition from DRX to CRX, the new Node-B may transmit its response (e.g. the CELL_UPDATE CONFIRM) while the WTRU is in DRX, thus preventing the WTRU from receiving the response.

Another problem may occur if the WTRU is allowed to autonomously release the E-DCH resources and the network does not receive an indication that the resources were released. In this scenario, the WTRU may be in DRX operation while the network thinks the WTRU is still in CRX mode because the E-DCH resources are still allocated. This may result in the WTRU failing to receive a message in the downlink.

SUMMARY

A method and apparatus for enabling cell reselection for WTRUs operating in discontinuous reception mode are disclosed. A method for discontinuous reception (DRX) implemented in a wireless transmit/receive unit (WTRU) during cell reselection including initiating cell reselection; disabling DRX operation, wherein disabling DRX operation enables continuous reception; transmitting a CELL UPDATE message; receiving a CELL UPDATE CONFIRM message; and enabling DRX operation based on the received CELL UPDATE CONFIRM message.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

When referred to hereafter, the term RNTI may refer to a dedicated E-RNTI, H-RNTI, C-RNTI or any other dedicated identifier that is assigned by the UTRAN to the WTRU during an RRC connection.

When referred to hereafter, the term E-RACH may refer to a resource that is used by a WTRU for uplink contention-based access in Evolved High Speed Packet Access (HSPA+) systems. The term E-RACH resource may also indicate any combination of a scrambling code, a channelization code, a timeslot, an access opportunity and/or a signature sequence that are associated to uplink contention-based channel in a future system architecture. The term E-RACH may also refer to the use of E-DCH in CELL_FACH, CELL_PCH, URA_PCH states or Idle mode.

Figure 1:
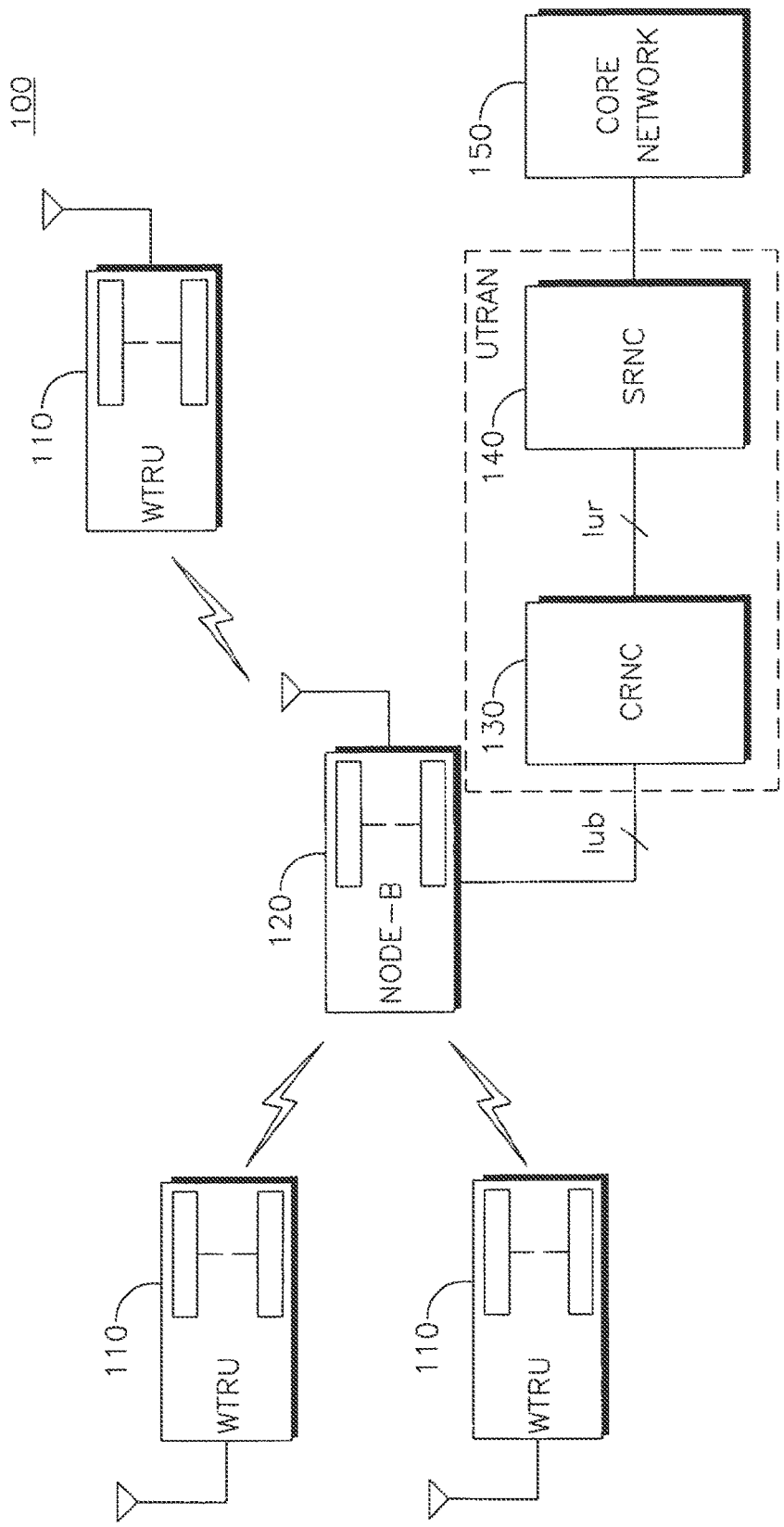
FIG. 1 shows a wireless communication system including a plurality of WTRUs, a Node-B, a controlling radio network controller (CRNC), a serving radio network controller (SRNC), and a core network.

FIG. 1 shows a wireless communication system 100 including a plurality of WTRUs 110, a Node-B 120, a controlling radio network controller (CRNC) 130, a serving radio network controller (SRNC) 140, and a core network 150. The Node-B 120 and the CRNC may be referred to as the UTRAN.

As shown in FIG. 1, the WTRUs 110 are in communication with the Node-B 120, which is in communication with the CRNC 130 and the SRNC 140. Although three WTRUs 110, one Node-B 120, one CRNC 130, and one SRNC 140 are shown in FIG. 1, it should be noted that any combination of wireless and wired devices may be included in the wireless communication system 100.

Figure 2:
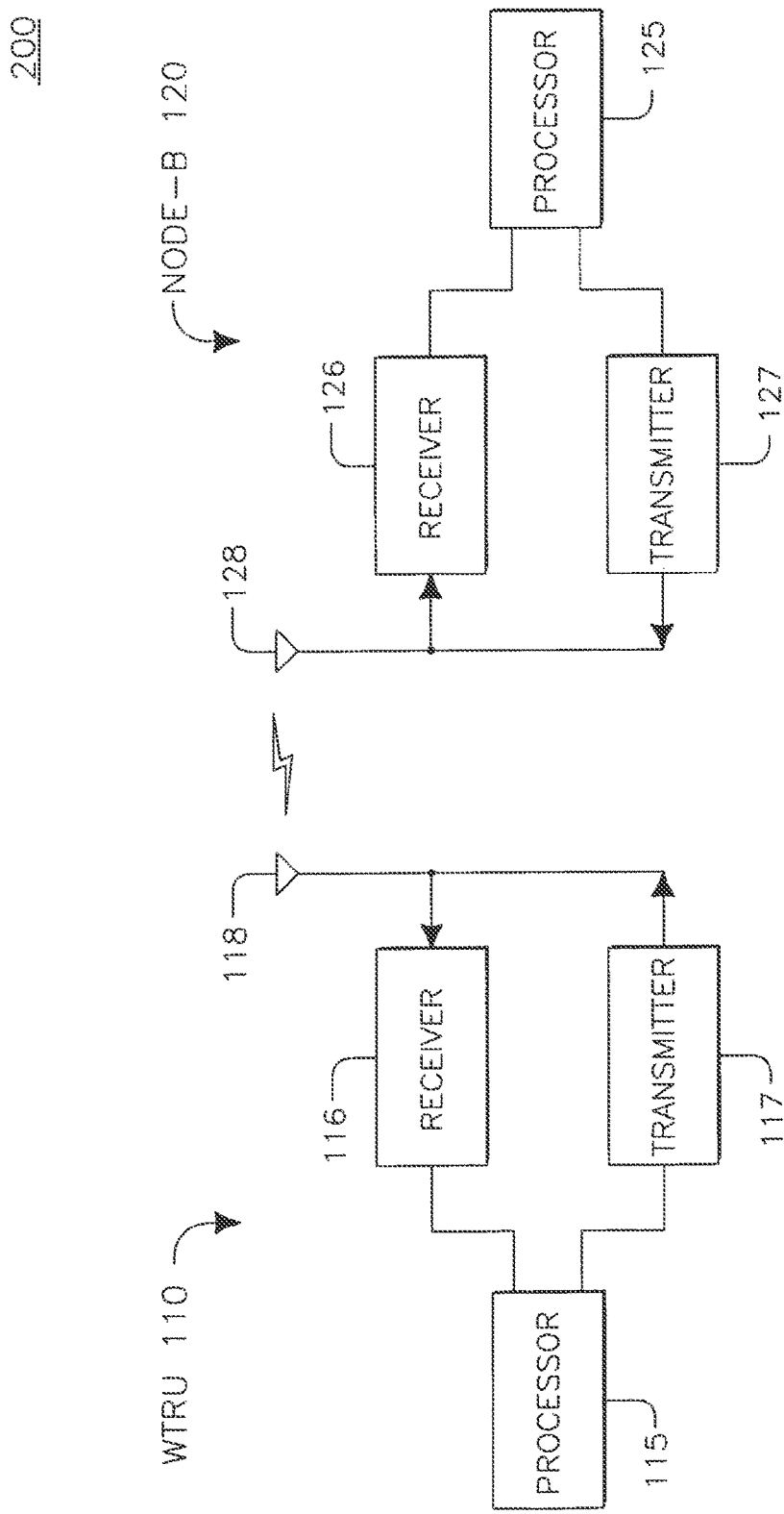
FIG. 2 is a functional block diagram of a WTRU and a Node-B of the wireless communication system of FIG. 2.

FIG. 2 is a functional block diagram 200 of a WTRU 110 and the Node-B 120 of the wireless communication system 100 of FIG. 1. As shown in FIG. 2, the WTRU 110 is in communication with the Node-B 120 and both are configured to perform a method of enabling cell reselection for a WTRU operating in DRX mode.

In addition to the components that may be found in a typical WTRU, the WTRU 110 includes a processor 115, a receiver 116, a transmitter 117, and an antenna 118. The processor 115 is configured to perform a method of enabling cell reselection for a WTRU operating in DRX mode. The receiver 116 and the transmitter 117 are in communication with the processor 115. The antenna 118 is in communication with both the receiver 116 and the transmitter 117 to facilitate the transmission and reception of wireless data.

In addition to the components that may be found in a typical base station, the Node-B 120 includes a processor 125, a receiver 126, a transmitter 127, and an antenna 128. The processor 125 is configured to perform a method of enabling cell reselection for a WTRU operating in DRX mode. The receiver 126 and the transmitter 127 are in communication with the processor 125. The antenna 128 is in communication with both the receiver 126 and the transmitter 127 to facilitate the transmission and reception of wireless data.

In a first embodiment, the WTRU 110 and the Node-B 120 may be configured to disable DRX operation based on a trigger or combination of triggers. For example, the WTRU 110 may be configured to disable DRX operation during cell selection/reselection when it releases its RNTI. The WTRU 110 may further be configured to disable DRX operation during cell selection/reselection if it does not have an RNTI. During cell selection/reselection, the Node-B 120 may determine that no H-RNTI variable is associated with the WTRU.

For example, while in CELL_FACH State, the WTRU 110 may be configured to continuously monitor the signal strength of neighboring cells. At some point, a change of "best cell" event may occur, where a neighboring cell meets the criteria for the WTRU 110 to perform a cell reselection (the criteria for cell reselection is well established as prior art). At this point, the WTRU may acquire system information (SI) in the new cell which is broadcast over the broadcast control channel (BCCH). The WTRU then may reset lower layers (e.g. MAC) and clear all variables and configuration parameters related to the previous cell. The WTRU 110 may further be configured to disable DRX operation. The WTRU 110 also configures lower layers for reception and transmission in the new cell using the configuration parameters acquired in the new cell. Then the WTRU 110 may transmit a a CELL_UPDATE message in the new cell and waits for a CELL_UDPATE_CONFIRM from the UTRAN.

Additional triggers for disabling DRX operation may also be used. For example, the WTRU 110 may disable DRX operation whenever it triggers a cell reselection. The WTRU 110 may disable DRX operation when sending a CELL_UPDATE using the E-DCH in the CELL_FACH state. The WTRU 110 may be configured to disable DRX operation when sending a CELL UPDATE message for cell reselection using the E-DCH in the CELL_FACH state. The WTRU 110 may also disable DRX operation when sending a CELL UPDATE message for radio link failure using the E-DCH in the CELL_FACH state. The WTRU 110 may disable DRX operation when sending a CELL UPDATE message using the RACH. The WTRU 110 may disable DRX operation when sending a CELL_UPDATE message for cell reselection using the RACH. The WTRU 110 may also disable DRX operation when sending a CELL_UPDATE message for radio link failure using RACH or when an RRC Connection Request message is sent. The WTRU 110 may be configured to disable DRX operation when it starts reading the System Information (SI) that is broadcast over the broadcast control channel (BCCH) and the WTRU 110 starts reception of broadcast and/or multicast data, (e.g. Multimedia Broadcast Multicast Service (MBMS)).

The WTRU 110 and the Node-B 120 may also be configured to enable DRX operation based on triggers. The WTRU 110 may be configured to enable DRX operation after receiving a dedicated RNTI (e.g. H-RNTI, E-RNTI and/or C-RNTI). The WTRU 110 may also enable DRX operation after receiving a CELL_UPDATE CONFIRM message from UTRAN. The WTRU 110 may enable DRX operation upon receiving a CELL_UPDATE CONFIRM message from UTRAN after having sent a CELL_UPDATE for cell reselection. The WTRU 110 may also enable DRX operation upon receiving an RRC Connection Setup message from UTRAN. In another option the WTRU 110 may be configured to enable DRX operation upon completing a reading of System Information that is broadcast over the BCCH.

Optionally, the WTRU 110 may be configured to disable DRX operation for a pre-configured period of time, Tx, or for N transmission time intervals (TTIs) after decoding a first High-Speed Shared Control Channel (HS-SCCH) transmission with the WTRU's H-RNTI and/or after successfully receiving a first downlink MAC-ehs protocol data unit (PDU), where Tx or N may be configured by higher layers or pre-configured in the WTRU 110. The WTRU 110 may then receive downlink data continuously for a period of time known by the Node-B 120 and the WTRU 110. After the time expires the WTRU 110 may be configured to enable DRX operation and, if the network has additional data to transmit, the Node-B 120 may use a DRX listening period to send data to the WTRU 110. Where listening periods define periods where the WTRU 110 must be capable of receiving transmission on the downlink; the WTRU 110 may turn off its receiver outside of these listening periods to save battery power. The WTRU 110 may then again move to continuous reception upon reception of HS-SCCH or first PDU after enabling DRX operation.

The triggering conditions listed herein to enable and disable DRX operation may be combined with any other triggering conditions that are well known by those skilled in the art such as activity/inactivity based timers, explicit signaling from UTRAN, etc.

In order for a WTRU 110 in DRX operation to properly perform a cell reselection (or alternatively cell update), the WTRU 110 must be capable of receiving the CELL_UPDATE CONFIRM message from the new Node-B. Accordingly, the WTRU 110 may be configured to disable DRX operation while performing cell reselection.

Figure 3:
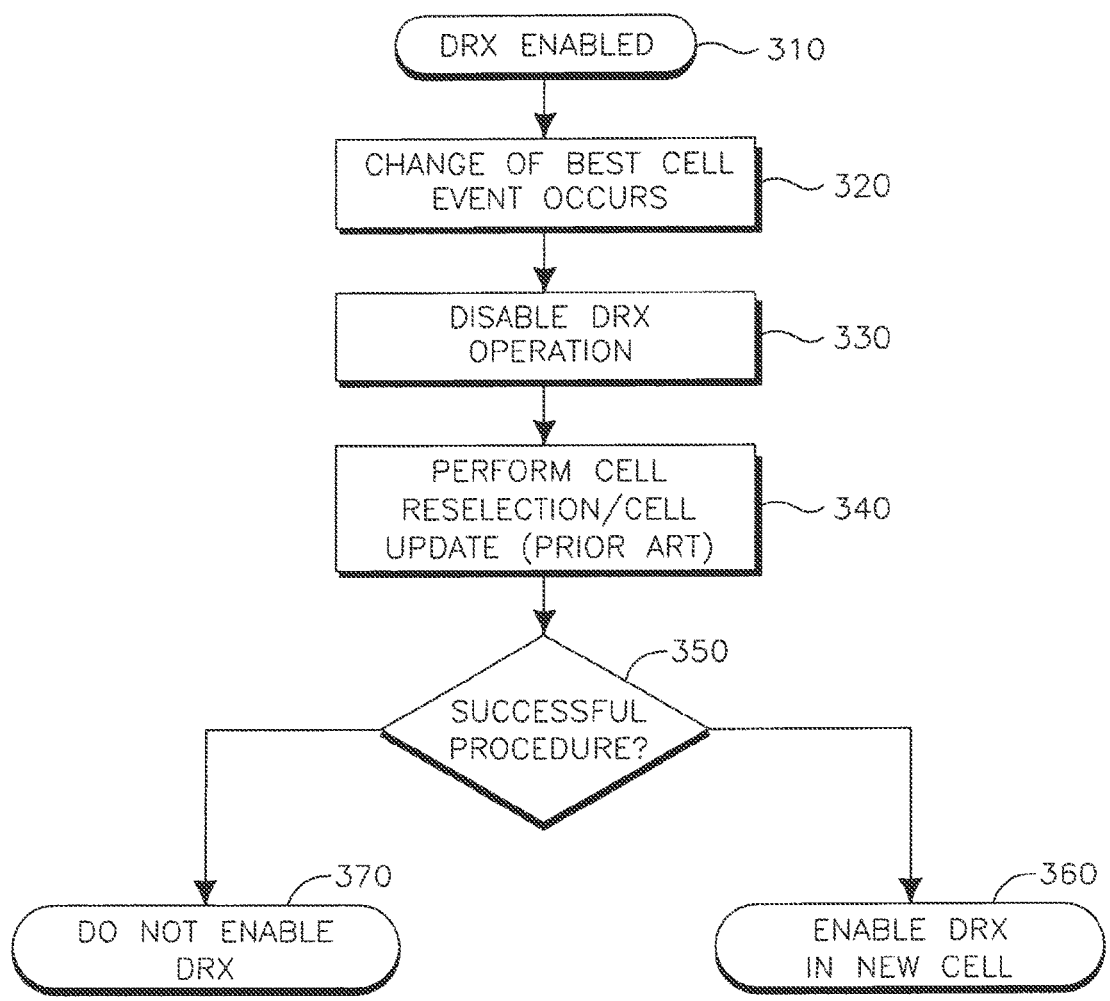
FIG. 3 shows an example realization of the DRX behavior.

FIG. 3 is a flow diagram of a DRX operation (300) during cell reselection (or alternatively cell update). The WTRU 110 may be configured to operate in DRX mode (310). An event may occur signaling a change of best cell (i.e. cell reselection or cell update), (320). The WTRU 110 may then disable DRX operation (330) (i.e. start continuous reception.) The WTRU 110 may then initiate a cell reselection/cell update procedure by transmitting a CELL UPDATE message (340). The WTRU 110 remains in continuous reception until a CELL UPDATE CONFIRM message and dedicated RNTI are received indicating the cell reselection/update was successful (350). If the procedure was successful, the WTRU 110 enables DRX operation in the new cell (360). If the procedure was unsuccessful, the WTRU 110 does not enable DRX operation (370) (e.g. maintain continuous reception or Idle mode.)

If a radio link failure occurs, the WTRU 110 may be configured to transmit a CELL UPDATE message indicating a radio link failure. This message may be transmitted even while the WTRU 110 is in the CELL_FACH state. The WTRU 110 may then disable DRX operation until the CELL UPDATE CONFIRM MESSAGE is received. Upon receiving the CELL UPDATE CONFIRM MESSAGE, the WTRU 110 may enable DRX operation.

For example, if a WTRU 110 transitions from CELL_PCH to the CELL_FACH state and does not have a dedicated H-RNTI when this transition occurs, the WTRU 110 may further be configured to disable DRX operation until the CELL UPDATE CONFIRM message is received and the WTRU 110 obtains a dedicated RNTI. The WTRU 110 may further be configured to enable DRX operation upon reception of CELL UPDATE CONFIRM if a dedicated RNTI is assigned and the WTRU 110 remains in the CELL_FACH state.

A WTRU 110 attempting to establish an RRC connection with the UTRAN may be configured to disable DRX operation. For example, the WTRU 110 may disable DRX operation in the CELL_FACH state when attempting to send an RRC Connection Request message from Idle Mode. The WTRU 110 may further be configured to only enable DRX operation in the CELL_FACH state when the WTRU 110 receives an RRC Connection Setup message from the UTRAN. Alternatively, the WTRU 110 may enable DRX operation when it is assigned an RNTI by the UTRAN.

As part of the alternate embodiment, the WTRU 110 may be configured to continue DRX operation (if enabled) while performing cell reselection (or alternatively cell update procedure). The WTRU 110 may determine the DRX pattern to be used by selecting a common RNTI which maps to a common DRX pattern. The common DRX pattern may be common to all WTRUs of a cell. In this case, the DRX pattern (or its index) may be signaled through a common control channel such as a broadcast channel.

Alternatively, a common DRX pattern may be assigned for a group of WTRUs in a cell. This common DRX pattern may be linked to common HS-DSCH resources broadcast for the WTRUs. In this case, a WTRU 110 may be configured to receive a list of DRX patterns (or index) broadcast over system information blocks (SIBs). The WTRU 110 may then select one of the DRX pattern based on a formula known by both the UTRAN and the WTRU 110, which uses the U-RNTI of the WTRU 110.

In another alternative, the WTRU 110 may be configured to base the DRX pattern on a common H-RNTI. The WTRU 110 may receive a CELL UPDATE CONFIRM message. In response to receiving the CELL UPDATE CONFIRM message, the WTRU may switch to using the dedicated RNTI. The UTRAN may be aware of the common H-RNTI the WTRU 110 is using and therefore the UTRAN may know the DRX pattern that the WTRU 110 is using.

In another alternative, the common DRX pattern may be common to all WTRUs of the system in which case, the WTRU 110 may be preconfigured with the DRX pattern (or its index). Alternatively, the WTRU 110 may be configured with the DRX pattern during RRC connection. Alternatively, the WTRU 110 may be configured to receive a signal configuring the DRX pattern, through a common control channel such as a broadcast channel.

In yet another alternative the common DRX pattern may be a fixed DRX pattern. The network may be configured to signal the fixed DRX pattern to the WTRU 110 during RRC connection or during RRC reconfiguration messages. The WTRU 110 may also be pre-configured with the fixed DRX pattern.

Figure 4:
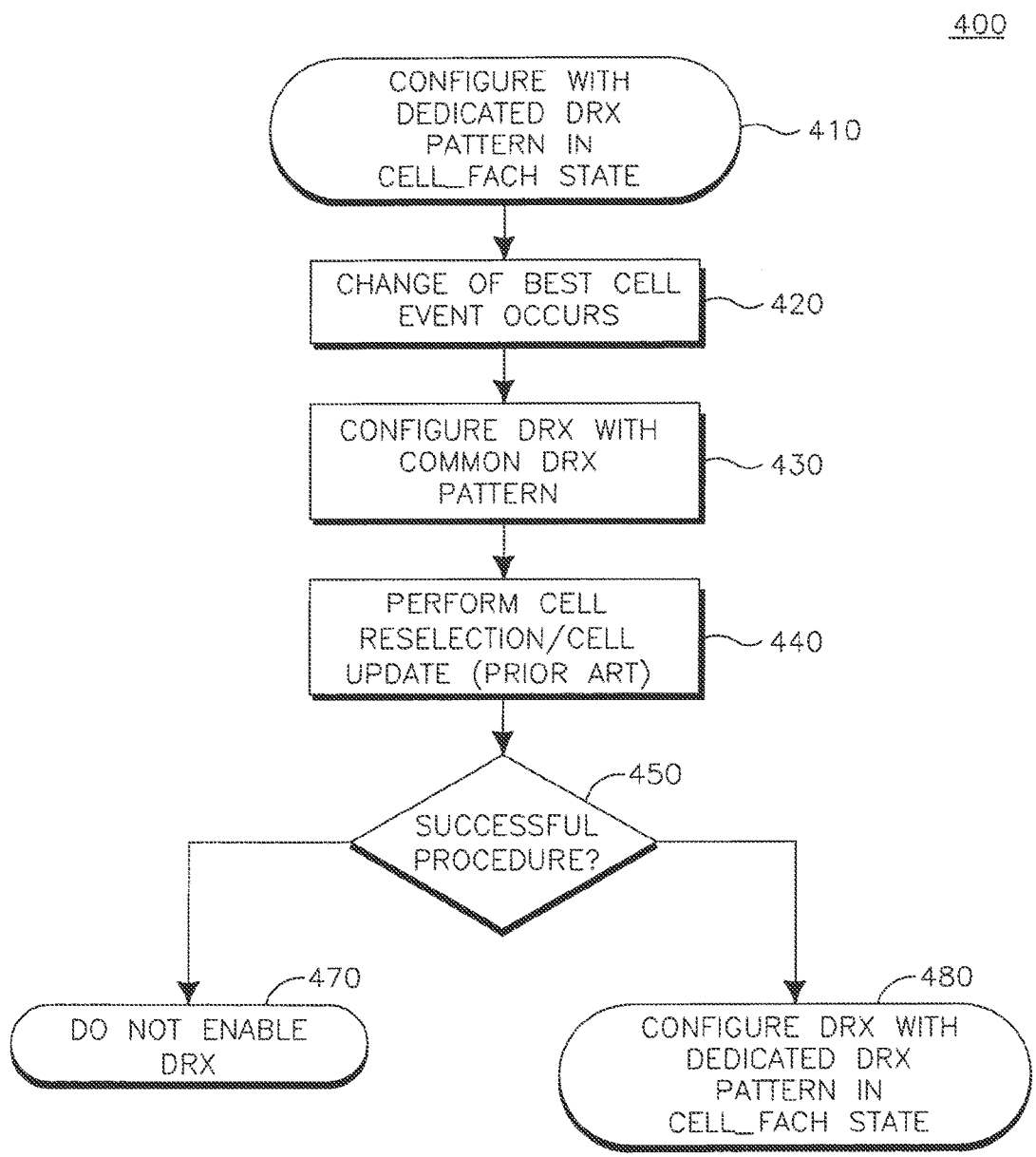
FIG. 4 shows example realization of DRX behavior while performing cell reselection.

FIG. 4 is a flow diagram of a DRX operation (400) for a WTRU 110, wherein the WTRU 110 changes the DRX pattern from using a WTRU-specific DRX pattern to a common or fixed DRX pattern to while performing a cell reselection (or alternatively cell update). Initially, the WTRU 110 may be configured with a dedicated DRX pattern while operating in the CELL_FACH state (410). A change of "best cell" event occurs (420). The WTRU 110 then configures its DRX operation with a common DRX pattern (430). Once the cell reselection procedure (or cell update) is complete (440), the WTRU 110 may determine whether the procedure was successful (450). If the procedure was successful the WTRU 110 may be configured to resume DRX operation using a dedicated DRX pattern that may be based on an RNTI that has been assigned to the WTRU (460). If the procedure was unsuccessful, the WTRU 110 does not enable DRX operation (470).

In a third embodiment, the WTRU 110 may be configured to continue using a DRX pattern it was using prior to performing cell reselection until it receives a CELL UPDATE CONFIRM.

In order for the target cell to successfully send the CELL UPDATE CONFIRM to the new WTRU, it must know the DRX pattern the WTRU 110 is using. Accordingly, the RNC may be configured to signal to the target cell the RNTI that the WTRU 110 was using in the source cell. The network may then be configured to calculate the DRX pattern for the WTRU 110 when sending the CELL UPDATE CONFIRM. Alternatively, the RNC may be configured to signal the DRX pattern that the WTRU 110 was using in the source cell.

Alternatively, the WTRU 110 may be configured to remain in DRX operation during cell reselection. The WTRU 110 may determine its DRX cycle and pattern based on its WTRU 110 U-RNTI. In this embodiment, the RNC may then be configured to signal the U-RNTI to the target Node-B 120 which may then determine the WTRUs DRX pattern and send the CELL UPDATE CONFIRM.

Alternatively, the WTRU 110 may be configured to always use the U-RNTI to derive the DRX pattern and thus it may remain in DRX operation even during cell reselection. The WTRU 110 may then be configured to change its DRX pattern when the U-RNTI is changed.

The above described DRX operations may also be applied to the case where the WTRU 110 attempts to establish an RRC connection with the UTRAN. In this case, the WTRU 110 employs a common DRX pattern until it receives the RRC Connection Setup message from UTRAN.

In another embodiment, the WTRU 110 may be configured to autonomously release E-DCH resources. The WTRU 110 may enable DRX operation when the E-DCH resources are released. The E-DCH resources may be released if E-DCH resource timer expires and the WTRU 110 has to release resources due to timer expiration. Additionally, the E-DCH resources may be released due to explicit indication from the Node-B. The WTRU 110 may further be configured to release the E-DCH resources if it no longer has any data to transmit in the UL.

In some situations, the WTRU 110 may be configured to autonomously release the E-DCH resources without any of the aforementioned triggers. If the WTRU 110 releases the resources without any of the abovementioned triggers, the WTRU 110 may be configured to enable DRX operation only after the E-DCH release timer expires. In this embodiment, the WTRU 110 may be configured to keep the timer running even if the E-DCH resources are released autonomously. The Node-B 120 may be configured to signal an explicit release indication. When an explicit Node-B 120 release indication is received, the WTRU 110 may stop the timer and enable DRX operation.

Optionally, the WTRU 110 may be configured to enable DRX operation mode only after N DRX cycles, where N may be configured by upper layers or preconfigured or calculated by the WTRU. The WTRU 110 may also be configured to enable DRX operation after a safe guard timer (Tg) expires, where Tg is started at the time the WTRU 110 releases the resources. The WTRU 110 may also be configured to enter DRX mode only after receiving an acknowledgment from the Node-B 120 that the resources are known to be released. Such an acknowledgment may be transmitted through physical layer signaling (e.g. E-DCH Absolute Grant Channel (E-AGCH) with a specific value), Layer 2 (L2) signaling or RRC signaling.

In another embodiment, the WTRU 110 or the UTRAN may not be configured to use the E-DCH in the CELL_FACH state. In this embodiment, a mechanism comprising disabling DRX operation upon initiation of the E-DCH in the CELL_FACH STATE and enabling DRX operation upon release of E-DCH resources may no longer applicable. Accordingly, the WTRU 110 may be configured to enable DRX operation even if the E-DCH in the CELL_FACH state is not supported; therefore methods that allow the WTRU 110 to enable DRX operation without support for the E-DCH in the CELL_FACH state are described in greater detail hereafter.

The DRX pattern may be based on the WTRU 110 RNTI such as C-RNTI, H-RNTI, U-RNTI or S-RNTI.

Figure 5:
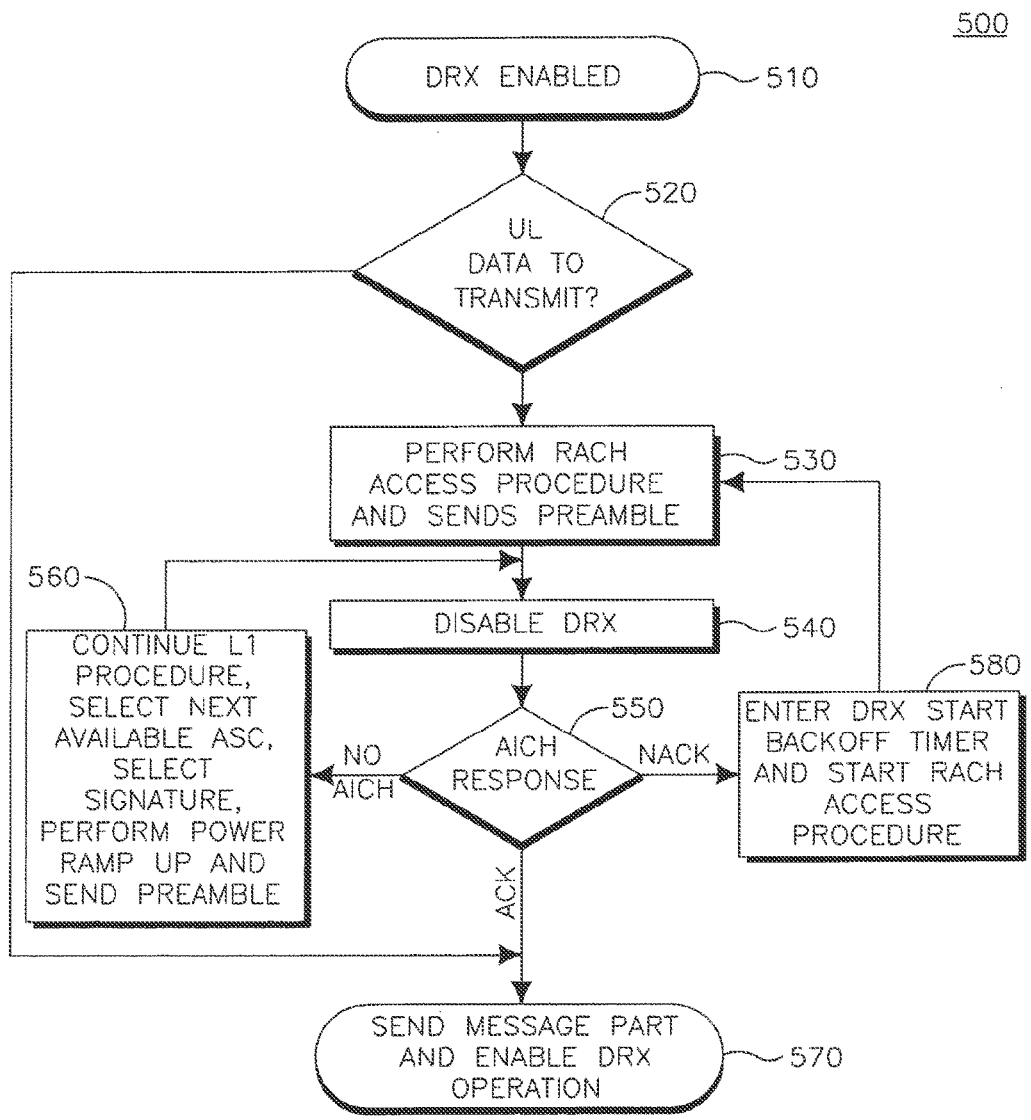
FIG. 5 shows example realization of DRX behavior when E-DCH in the CELL_FACH state and Idle mode is not supported.

FIG. 5 shows an example of DRX operation when the E-DCH in the CELL_FACH state is not supported. The WTRU 110 may be configured with DRX operation enabled except when a RACH preamble is sent (510). While in DRX mode, the WTRU 110 determines whether there is uplink data to transmit (520). If there is uplink data to transmit, the WTRU 110 may be configured to transmit a RACH preamble (530). The WTRU 110 then disables DRX operation (540). This may allow the WTRU 110 to successfully receive the Acquisition Indicator Channel (AICH) sent by the Node-B. The DRX operation may remain disabled until an AICH response is received (550). If no AICH transmission is received for a predetermined time period, DRX operation remains disabled and the WTRU 110 performs a power ramp up to send another preamble (560). If an ACK is received on the AICH, the WTRU 110 may send the message part and enables DRX operation (570). If a NACK is received on the AICH, the WTRU 110 may enable DRX operation (580). This DRX operation may remain enabled until a RACH access procedure is reinitiated (i.e. after backoff timer expires and a persistency test passes). Alternatively, the WTRU 110 may be configured to remain in CRX operation until a positive ACK is received or until the WTRU 110 has exceeded the number of retries. If the WTRU 110 has no uplink data to transmit, the WTRU 110 may be configured to remain in DRX operation.

Alternatively, the WTRU 110 may be configured to enable DRX operation after the expiration of a timer (Tx) after the message has been transmitted over the RACH.

Alternatively, the WTRU 110 may be configured to enable DRX operation as soon as the message has been transmitted over the RACH.

In yet another alternative, the WTRU 110 may be configured to disable DRX operation when an RRC message is transmitted over RACH and a response from the UTRAN is expected. The RRC message may include a CELL UPDATE message or an RRC Connection Request message. Upon reception of the response the WTRU 110 may be configured to enable DRX operation.

Figure 6:
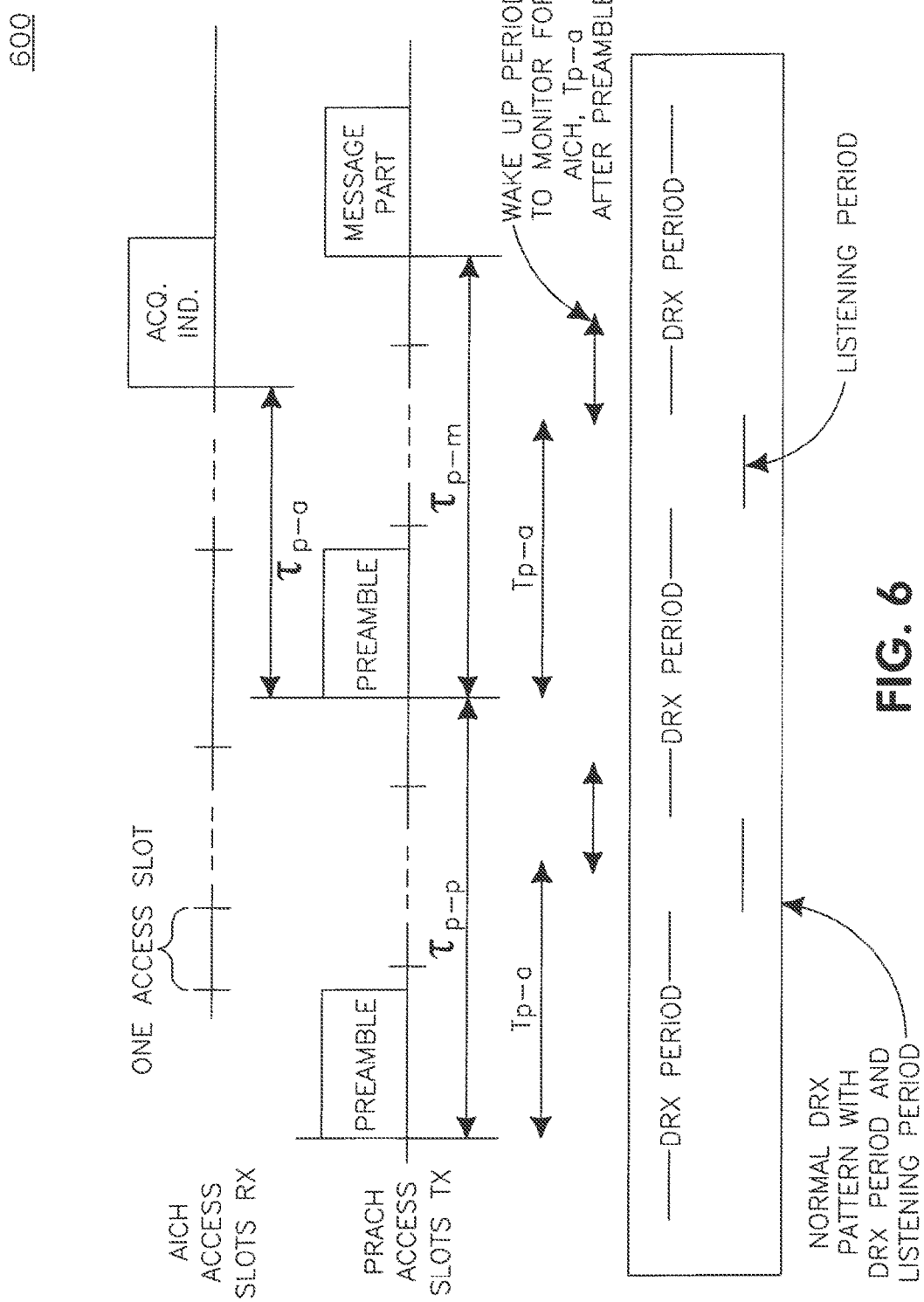
FIG. 6 shows an example DRX timing period for a WTRU during a RACH procedure.

FIG. 6 shows an example DRX timing period for a WTRU during a RACH procedure. A RACH transmission may "override" the DRX patterns in terms of downlink reception. The WTRU may be configured to receive downlink channels for a predetermined period of time (Tp-a) following the transmission of a RACH preamble, even if DRX is enabled and according to the DRX pattern, the WTRU 110 would otherwise not be scheduled for a listening period. The WTRU 110 may be configured to monitor the downlink Tp-a after sending the preamble in order to ensure that it may successfully receive the AICH, where Tp-a is the preamble to acquisition indication (AI) distance. The WTRU 110 may further be configured to wake up to monitor the downlink channel for one access slot even if it falls in the DRX period.

The options described in this embodiment may also be applicable to a WTRU 110 that uses the E-DCH in the CELL_FACH state and Idle mode for uplink transmission, wherein the options described are applicable until an acknowledgement is received and/or resources are assigned for the WTRU. When the WTRU 110 starts uplink transmission using E-DCH in CELL_FACH the WTRU 110 continues with CRX operation until the resources are released.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit/receive unit (WTRU) comprising:
a processor configured to:
  determine that the WTRU has a high-speed downlink shared channel (HS-DSCH) radio network temporary identifier (H-RNTI);
  enable DRX operation in response to the determination that the WTRU has the H-RNTI;
  disable discontinuous reception (DRX) operation in response to a release of the H-RNTI, wherein being configured to disable DRX operation comprises being configured to start continuous reception operation in the WTRU;
  receive an E-DCH resource;
  release the E-DCH resource;
  start a timer, wherein being configured to start the timer is associated with the release of the E-DCH resource; and
  enable DRX operation in response to expiration of the timer.

2. The WTRU of claim 1, wherein the processor is further configured to receive an H-RNTI associated with a new cell.

3. The WTRU of claim 2, wherein the processor is further configured to reenable DRX operation in response to a determination that the WTRU has the H-RNTI associated with the new cell.

4. The WTRU of claim 1, wherein to perform the cell reselection the processor is further configured to:
  transmit a CELL UPDATE message associated with performance of the cell reselection; and
  receive a CELL UPDATE CONFIRM message that indicates that the cell reselection is successful.

5. The WTRU of claim 1, wherein the processor is further configured to determine that the WTRU is in a CELL_FACH state when the WTRU has the H-RNTI.

6. The WTRU of claim 1, wherein the processor is further configured to perform cell reselection, and wherein the release of the H-RNTI is associated with the cell reselection.

7. A method comprising:
  determining that the WTRU has a high-speed downlink shared channel (HS-DSCH) radio network temporary identifier (H-RNTI);
  enabling DRX operation in response to the determination that the WTRU has the H-RNTI;
  performing cell reselection and releasing the H-RNTI;
  disabling discontinuous reception (DRX) operation in response to the release of the H-RNTI, wherein disabling DRX operation comprises starting continuous reception operation in the WTRU;
  receiving an E-DCH resource;
  releasing the E-DCH resource;
  starting a timer, wherein the starting of the timer is associated with the releasing of the E-DCH resource; and
  enabling DRX operation in response to expiration of the timer.

8. The method of claim 7, further comprising receiving an H-RNTI associated with a new cell.

9. The method of claim 8, further comprising reenabling DRX operation in response to a determination that the WTRU has the H-RNTI associated with the new cell.

10. The method of claim 7, further comprising:
  transmitting a CELL UPDATE message associated with performance of the cell reselection; and
  receiving a CELL UPDATE CONFIRM message that indicates that the cell reselection is successful.

11. The method of claim 7, further comprising determining that the WTRU is in a CELL_FACH state when the WTRU has the H-RNTI.

* * * * *